United States Patent
Sun

(10) Patent No.: US 8,863,949 B2
(45) Date of Patent: Oct. 21, 2014

(54) TOOL BOX FOR REPAIRING GLASSES

(75) Inventor: Shiyu Sun, Shanghai (CN)

(73) Assignee: Shanghai Easy-Use Tools Enterprise Co., Ltd., Shanghai (CN)

( * ) Notice: Subject to any disclaimer, the term of this patent is extended or adjusted under 35 U.S.C. 154(b) by 100 days.

(21) Appl. No.: 13/106,366

(22) Filed: May 12, 2011

(65) Prior Publication Data

US 2012/0205271 A1    Aug. 16, 2012

(30) Foreign Application Priority Data

Feb. 15, 2011   (CN) ...................... 2011 2 0039253 U

(51) Int. Cl.
| | |
|---|---|
| *B65D 69/00* | (2006.01) |
| *B65D 71/00* | (2006.01) |
| *B25H 3/02* | (2006.01) |
| *G02C 13/00* | (2006.01) |

(52) U.S. Cl.
CPC ................ *B25H 3/02* (2013.01); *G02C 13/001* (2013.01)
USPC ......... 206/234; 206/373; 206/37.4; 220/4.22; 220/345.1

(58) Field of Classification Search
USPC ............ 206/373, 323, 324, 6.1, 823, 38, 234, 206/349, 372, 37, 37.4, 39; 132/288, 331, 132/286; 220/4.21, 4.22, 212, 345.1; 224/257, 258, 254
See application file for complete search history.

(56) References Cited

U.S. PATENT DOCUMENTS

| | | | | |
|---|---|---|---|---|
| 2,412,056 | A | * | 12/1946 | Mosch ...................... 70/456 R |
| 3,188,157 | A | * | 6/1965 | Rand ............................. 312/202 |
| 3,392,868 | A | * | 7/1968 | Pfrommer ..................... 220/520 |
| 3,619,596 | A | * | 11/1971 | Jackson ........................ 362/156 |
| 4,239,308 | A | * | 12/1980 | Bradley ........................ 312/201 |
| 4,697,379 | A | * | 10/1987 | McPhaul ........................ 43/54.1 |
| 5,632,394 | A | * | 5/1997 | Mecca et al. .................. 220/824 |
| 6,070,749 | A | * | 6/2000 | Joulia .......................... 220/4.22 |
| 6,145,515 | A | * | 11/2000 | Wu ............................... 132/295 |
| 6,302,120 | B1 | * | 10/2001 | Kuo ............................. 132/295 |
| 6,425,506 | B1 | * | 7/2002 | Wu ............................... 224/219 |
| 6,427,837 | B1 | * | 8/2002 | Shields ......................... 206/449 |
| 6,540,083 | B2 | * | 4/2003 | Shih ............................. 206/581 |
| 6,961,977 | B2 | * | 11/2005 | Seidler ............................ 16/320 |
| 7,370,758 | B2 | * | 5/2008 | Smith ........................... 206/349 |
| 7,813,060 | B1 | * | 10/2010 | Bright et al. .................. 359/802 |
| 2005/0284497 | A1 | * | 12/2005 | Chavez et al. ................ 132/288 |

* cited by examiner

*Primary Examiner* — Luan K Bui
*Assistant Examiner* — Rafael Ortiz
(74) *Attorney, Agent, or Firm* — Suiter Swantz pc llo

(57) ABSTRACT

The present invention discloses a box tool for repairing glasses including a box bottom and a box cover. A hanging ring is disposed on an end of the box bottom in order that consumers can hang the tool box at different place they want. The box bottom interconnects the box cover with a pivoting axle; the box cover can rotate in a range of 360° about the pivoting axle; a first fastener is disposed on a first end of the box bottom; a second fastener is disposed on a first end of the box cover. The box cover is made of transparent material with a megaloscope disposed in the middle thereof. A lamp and a battery are also disposed on a second end of the box bottom.

5 Claims, 2 Drawing Sheets

TOOL BOX FOR REPAIRING GLASSES

CROSS-REFERENCE TO RELATED APPLICATIONS

The present application claims priority based on Chinese Application No. 201120039253.1 filed Feb. 15, 2011, the disclosure of which is hereby incorporated by reference in its entirety.

TECHNICAL FIELD

The present invention relates to a tool box, and particularly to a tool box for repairing glasses.

BACKGROUND

Tools for repairing glasses, clocks, and mobile phones are generally compact, pocket-size and tend to be lost. Sometimes a megaloscope is needed when removing fine details, even with illumination. A compact tool box is desired to keep these tools for carrying and preservation.

SUMMARY

The present invention is directed to a compact and flexible tool box for repairing glasses, which is convenient for both use and portable.

An embodiment of the present invention provides a box tool for repairing glasses, which has a box bottom and a box cover. The box bottom interconnects the box cover with a perpendicular pivoting axle. The box cover may rotate in a range of 360° about the pivoting axle.

Preferably, the box bottom is constructed to be elliptic. A first fastener and the pivoting axle are disposed on a first and a second ends of the box bottom, respectively. The box cover may be constructed to be elliptic with the same size to that of the box bottom. A second fastener and a pivoting hole for mating the pivoting axle are disposed on a first and a second ends of the box cover, respectively.

A lamp/flashlight and a battery may be disposed on the second end of the box bottom. The box cover may be made of transparent material. Furthermore, a megaloscope may be disposed in the middle of the box cover. In addition, a hanging ring may also be disposed on the first end of the box bottom.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings.

Figure 1:
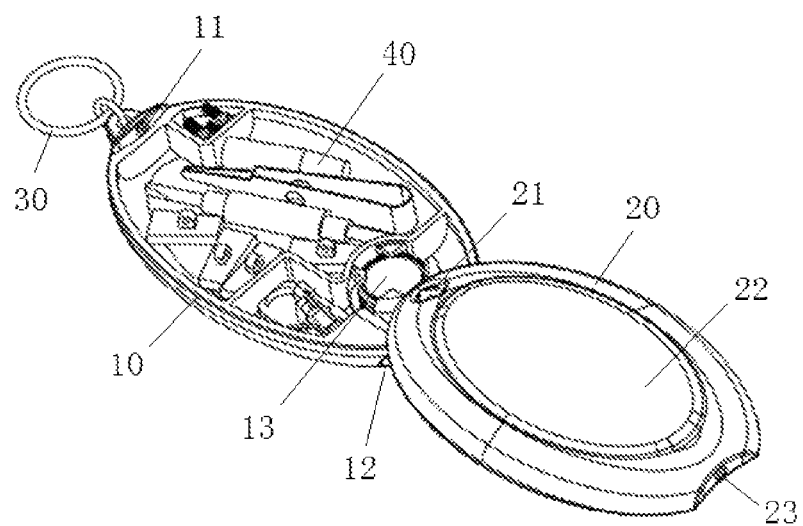
FIG. 1 is an external view of a tool box for repairing glasses according to the present invention with the cover of the tool box opened.
Figure 2:
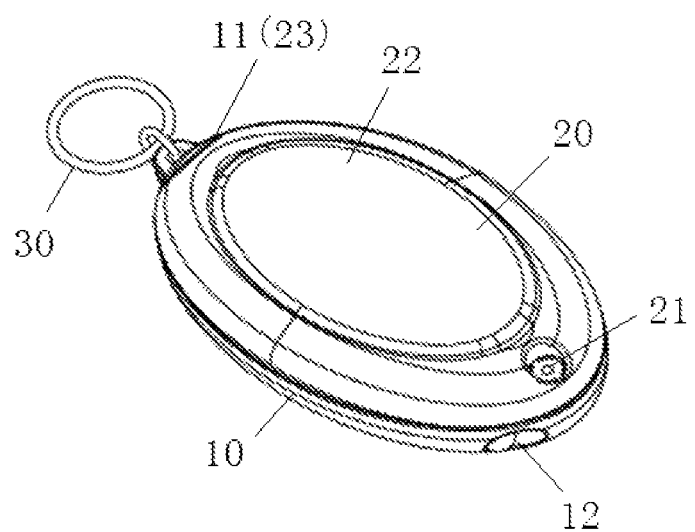
FIG. 2 is an external view of a tool box for repairing glasses according to the present invention with the cover closed.

Referring to FIG. 1 and FIG. 2, a tool box according to the present invention includes a box bottom 10, a box cover 20, and a hanging ring 30. The box bottom 10 interconnects the box cover 20 with a perpendicular pivoting axle 21. The box cover 20 may rotate in a range of 360° about the pivoting axle 21 to open or close the tool box conveniently.

The box bottom 10 of the tool box according to the present invention is constructed to be elliptic for easily hand holding. A first fastener 11 is disposed on a first end of the elliptic box bottom 10, and the pivoting axle 21 is disposed on a second end of the elliptic box bottom 10.

The box cover 20 of the tool box according to the present invention is constructed to be elliptic, the size of which is the same to that of the box bottom 10, in order that the box cover 20 mates with the box bottom 10 conveniently. A second fastener 23 is disposed on a first end of the elliptic box cover 20, and a pivoting hole mating with the pivoting axle 21 is disposed on a second end of the elliptic box cover 21.

When being operated, the first end of the box cover 20 can be rotated, so that the box tool can be opened and the tool 40 can be taken out for using. After work, the box cover 20 can be rotated toward its original place while the second fastener 23 of the box cover 20 is aligned with the first fastener 11 of the box bottom 10, so that the first fastener 11 and the second fastener 23 snap fit automatically.

Preferably, the box cover 20 of the tool box according to the present invention is made of transparent material with a megaloscope disposed in the middle thereof.

Preferably, the box bottom 10 of the tool box according to the present invention has a lamp 12 and a battery 13 disposed on the second end thereof, which provide illumination for removing fine details, or may be used as a flashlight independently.

The megaloscope 22 may have an effect of photospot, illumination, and magnifying when it is rotated to the plane over the lamp 12.

The hanging ring 30 is selectively disposed on the first end of the box bottom 10 for carrying conveniently.

Although the preferable embodiment of the tool box for repairing glasses according to the present invention is disclosed in specification, but it will be apparent that numbers and types of the tools preserved in the tool box are not limited to the preferable embodiment and the accompany FIG. 1, consumers can choose different tools according to their requirements.

It is believed that the tool box for repairing glasses of the present invention and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A box tool for repairing glasses, comprising:
   a box bottom;
   a box cover, the box cover interconnects with the box bottom via a perpendicular pivoting axle,
   wherein the box cover is made of transparent material with a magnifier disposed in the middle of the box cover, and the box cover is rotatable in a range of 360° about the perpendicular pivoting axle, and
   wherein the box bottom is further disposed with a lamp and a battery, the lamp being located on the outside of the box bottom, the lamp being positioned for providing illumination outwardly with respect to the box bottom when the box cover is in a closed position and for providing illumination for an area beneath the magnifier when the box cover is in an open position.

2. The tool box for repairing glasses as set forth in claim 1, wherein the box bottom is constructed to be elliptic, and a first end and a second end of the box bottom are disposed with a first fastener and the pivoting axle, respectively.

3. The tool box for repairing glasses as set forth in claim 2, wherein the box cover is constructed to be elliptic with the same size to that of the box bottom, and a first end and a second end of the box cover are disposed with a second fastener and a pivoting hole for mating with the pivoting axle, respectively.

4. The tool box for repairing glasses as set forth in claim 3, wherein a lamp and the battery are disposed at the second end of the box bottom, the lamp being positioned for providing illumination to a predetermined area within the rotable range of the magnifier disposed in the middle of the box cover.

5. The tool box for repairing glasses as set forth in claim 1, wherein a first end of the box bottom is disposed with a hanging ring.

* * * * *